(12) United States Patent
Cruz-Ruiz et al.

(10) Patent No.: US 12,168,579 B2
(45) Date of Patent: Dec. 17, 2024

(54) TOTE STOP ASSEMBLY AND METHOD OF USING THE SAME

(71) Applicant: Intelligrated Headquarters, LLC, Mason, OH (US)

(72) Inventors: Edmundo Cruz-Ruiz, Mason, OH (US); Justen Pahls, Hamilton, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 83 days.

(21) Appl. No.: 18/156,964

(22) Filed: Jan. 19, 2023

(65) Prior Publication Data

US 2024/0246776 A1 Jul. 25, 2024

(51) Int. Cl.
*B65G 47/88* (2006.01)
*B65G 13/02* (2006.01)

(52) U.S. Cl.
CPC ......... *B65G 47/8815* (2013.01); *B65G 13/02* (2013.01); *B65G 2205/00* (2013.01)

(58) Field of Classification Search
None
See application file for complete search history.

(56) References Cited

U.S. PATENT DOCUMENTS

| | | | | |
|---|---|---|---|---|
| 1,461,465 | A | * | 7/1923 | Stebler ................... B65G 47/54 198/463.5 |
| 2,576,369 | A | * | 11/1951 | Sticelber .................. A21B 3/07 198/444 |
| 2,762,487 | A | * | 9/1956 | Temple ..................... A21B 3/07 198/463.4 |
| 8,713,899 | B2 | | 5/2014 | Hortig et al. |
| 2002/0134646 | A1 | | 9/2002 | Itoh |
| 2003/0196872 | A1 | | 10/2003 | Whittle et al. |
| 2022/0230229 | A1 | | 7/2022 | Schubilske |
| 2022/0289484 | A1 | | 9/2022 | Oberpriller et al. |

FOREIGN PATENT DOCUMENTS

| | | |
|---|---|---|
| EP | 4056502 A1 | 9/2022 |
| JP | 59-227614 A | 12/1984 |
| JP | 6490991 B2 | 3/2019 |

OTHER PUBLICATIONS

Extended European Search Report Mailed on Jun. 13, 2024 for EP Application No. 24152040, 8 page(s).

* cited by examiner

*Primary Examiner* — William R Harp
(74) *Attorney, Agent, or Firm* — Alston & Bird LLP

(57) ABSTRACT

Various embodiments are directed to a tote stop assembly configured for a conveyor assembly and methods of operating the same. In various embodiments, the tote stop assembly comprises a cam assembly comprising a cam element secured relative to an outer surface of a drive roller, the drive roller being configured to cause motor-driven rotation of the cam element about a central axis of the drive roller; and a tote stop component comprising a cam follower configured for physical engagement with the cam element such that the motor-driven rotation of the cam element causes vertical movement of the tote stop component between raised and lowered positions; the tote stop assembly being configurable in an actuated configuration to selectively obstruct an object from moving along a conveyor path based on an operation of the drive roller, the actuated configuration being defined by the tote stop component being arranged in the raised position.

19 Claims, 7 Drawing Sheets

TOTE STOP ASSEMBLY AND METHOD OF USING THE SAME

FIELD OF THE INVENTION

Various embodiments of the present invention relate generally to a material handling system, and more particularly, to a workstation for delivering goods to an operator for handling.

BACKGROUND

Picking or workstations are essential components of high volume distribution and fulfillment operations. Conventionally, order picking requires an order picker to take an order list, walk through racks of products filled with containers of products to pick from, picking the listed products from product containers, and placing the picked products into an order container for delivery to packaging. However, this solution is, in some examples, slow and requires additional employees.

Applicant has identified several technical challenges associated with order picking and other associated systems and methods. Through applied effort, ingenuity, and innovation, many of these identified challenges have been overcome by developing solutions that are included in embodiments of the present invention, many examples of which are described in detail herein.

BRIEF SUMMARY

Various embodiments are directed to tote stop assembly and method of using the same. In various embodiments, a tote stop assembly for a conveyor assembly may comprise a cam assembly comprising a cam element secured relative to an outer surface of a drive roller, the drive roller being configured to cause motor-driven rotation of the cam element about a central axis of the drive roller; and a tote stop component comprising a cam follower configured for physical engagement with the cam element such that the motor-driven rotation of the cam element causes a vertical movement of the tote stop component between a raised position and a lowered position; wherein the tote stop assembly is configurable in an actuated configuration to selectively obstruct one or more objects from moving along a conveyor path based on an operation of the drive roller, the actuated configuration being defined at least in part by the tote stop component being arranged in the raised position.

In various embodiments, the tote stop assembly may be configurable in a nominal configuration to selectively enable the one or more objects to move over the tote stop assembly along the conveyor path based on the operation of the drive roller, the nominal configuration being defined at least in part by the tote stop component being arranged in the lowered position. In various embodiments, the tote stop component may be configured such that, in the lowered position, a top surface defined by a tote stop housing is positioned in an at least substantially coplanar arrangement within an adjacent conveyor surface. In various embodiments, the tote stop component may be configured such that, in the raised position, at least a portion of a tote stop housing is positioned vertically above an adjacent conveyor surface, so as to embody a physical obstacle positioned along the conveyor path.

In various embodiments, the tote stop assembly may further comprise one or more position sensors configured to capture position data corresponding to a vertical position of the tote stop component. In certain embodiments, the drive roller of the cam assembly may be configured to be selectively operated based at least in part on the position data captured by the one or more position sensors. In certain embodiments, the one or more position sensors may be configured to detect when the tote stop component is positioned in one or more of the raised position and the lowered position. Further, in certain embodiments, the one or more position sensors may include a first position sensor configured to captured first position data corresponding to the tote stop component being in the raised position and a second position sensor configured to captured second position data corresponding to the tote stop component being in the lowered position. In certain embodiments, the one or more position sensors may be mounted to a mounting bracket rigidly connected to a conveyor frame element of the conveyor assembly and configured to receive at least a portion of the tote stop assembly in order to secure the tote stop assembly in an installed position along the conveyor path.

In various embodiments, the tote stop assembly may comprises one or more guide rod secured to the tote stop component, the one or more guide rod being positioned in an at least substantially vertical configuration and configured to at least partially define a vertical range of motion of the tote stop component relative to the cam assembly. In certain embodiments, the one or more guide rod may be slidably engaged to one or more mounting brackets such that each guide rod defines a respective vertical range of motion through which the one or more guide rod is moveable relative to the mounting bracket in one or more vertical directions. In various embodiments, the drive roller may be configured such that the central axis thereof is oriented an at least substantially lateral direction, the lateral direction being at least substantially perpendicular to a conveyance direction of the conveyor path.

In various embodiments, the cam assembly may be configured such that the motor-driven rotation of the cam element causes the cam element to move from a first angular position to a second angular position, wherein the first angular position corresponds to the tote stop component being positioned in the lowered position and the wherein the second angular position corresponds to the tote stop component being positioned in the raised position. In certain embodiments, the first angular position of the cam element may be defined at least in part by a first radial distance between the central axis of the drive roller and a first portion of a peripheral engagement surface of the cam element engaged with the cam follower, and wherein the second angular position of the cam element may be defined at least in part by a second radial distance between the central axis of the drive roller and a second portion of the peripheral engagement surface of the cam element engaged with the cam follower, the second radial distance defined by the second angular position of the cam element being at least substantially greater than the first radial distance defined by the first angular position of the cam element such that a vertical separation between the cam follower and the central axis is increased as the cam element is rotated from the first angular position to the second angular position. In certain embodiments, the motor-driven rotation of the cam element from the first angular position to the second angular position may be defined by the cam element being rotated through an angle of rotation of at least approximately 180 degrees.

In various embodiments, the tote stop component may comprise a tote stop housing secured relative to the cam follower such that the tote stop housing moves with the cam follower through a vertical range of motion based in part on the motor-driven rotation of the cam element engaged with the cam follower. In certain embodiments, the tote stop housing may define a roller mount slot provided along a top surface thereof, and wherein the tote stop component further comprises a conveyor roller mounted within the roller mount slot of the tote stop housing, the tote stop assembly being configured such that the tote stop component being positioned in the lowered position is defined at least in part by the conveyor roller being positioned to engage the one or more objects moving along the conveyor path to facilitate movement of the one or more objects over the tote stop assembly. In certain embodiments, the central axis of the drive roller may define a first axis of rotation and a second central axis of the conveyor roller defines a second axis of rotation, wherein the first axis of rotation and the second axis of rotation are arranged in at least substantially parallel configuration relative to one another. In various embodiments, the tote stop component may comprise a tote stop housing defined at least in part by a side engagement surface configured to embody a physical obstruction when the tote stop component is positioned in the raised position. In various embodiments, the conveyor assembly may be defined at least in part by a goods to person workstation.

BRIEF DESCRIPTION OF THE DRAWINGS

Reference will now be made to the accompanying drawings, which are not necessarily drawn to scale, and wherein.

DETAILED DESCRIPTION

Figure 1A:
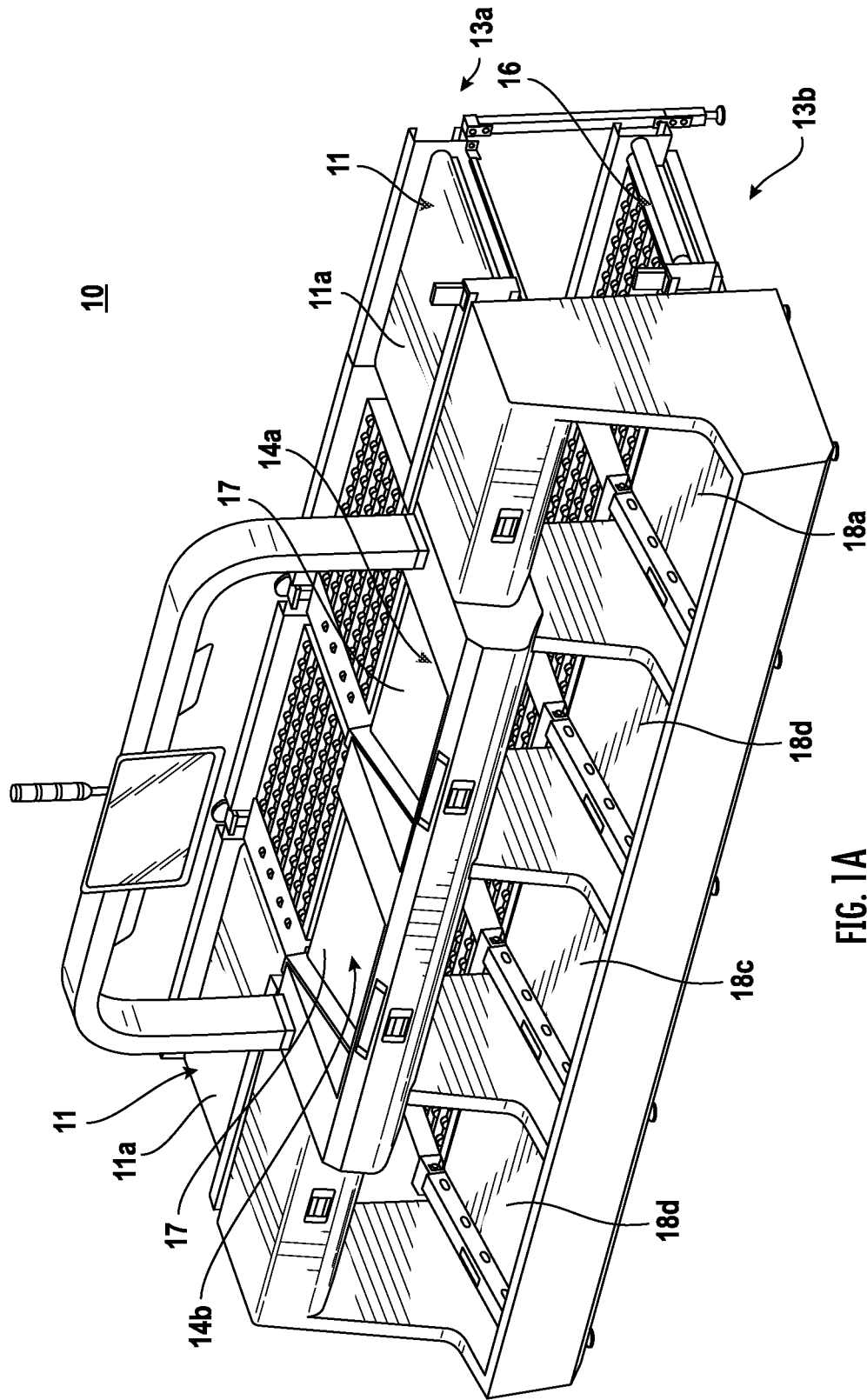
FIGS. 1A-1C illustrate various views of a goods to operator workstation in accordance with various exemplary embodiments described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The components illustrated in the figures represent components that may or may not be present in various embodiments of the invention described herein such that embodiments may include fewer or more components than those shown in the figures while not departing from the scope of the invention. Various embodiments shown and discussed herein may include different features, such features may be used interchangeably in various other embodiments unless explicitly stated otherwise.

In some examples, historical order picking solutions required an order picker to take an order list, walk through racks of products filled with containers of products to pick from, pick the listed products from product containers, and place the picked products into an order container for delivery to packaging. Such solutions could be effective, but they were overly time consuming and were fraught with errors. In response, example automated solutions can reduce time, number of employees, injuries, and costs. An automated system can, in some examples, facilitate the delivery of product containers to the picker for picking, return the product containers to storage, and deliver the filled orders to packing and shipping. Indeed, in some examples, automated systems are configured to rely on conveyor systems to deliver a product to an area or workstation.

Examples of such automated systems, in the form of a goods to operator workstation (e.g., a goods to person workstation), are disclosed herein. The goods to person workstation described herein, in accordance with one or more embodiments of the present disclosure, may be attachable or be positioned next to an infeed conveyor and a discharge conveyor of a material handling system that is configured for automatically presenting infeed containers to an operator for goods handling and for automatically taking away handled container to the discharge conveyor. Thus, the goods and/or the containers are easily accessible to the operator at an order picking position without the need for the operator to walk through the aisles or to manually move containers on the conveyors.

Various embodiments herein include a goods to person (GTP) workstation designed for increased usability and functionality. The GTP workstation of various embodiments may allow for a single operator to move objects from one container (e.g., a reusable tote) and place them into one or more other containers (e.g., a corrugated cardboard box) using a multiple level GTP workstation that allows for accessibility for the operator to transfer the objects. During operation, the GTP is designed with a gap between the upper level and lower level that is sufficiently large to receive the lower level container (e.g., a corrugated cardboard box) into the lower level but sufficiently small so as to allow for a user to access the upper level container. The gap between the upper level and lower level allows for the operator to place the container into the lower level instead of having to assembly and/or place the containers on a conveyor elsewhere to be provided to the lower level. Various components discussed herein allow for increased adjustability to account for different types and sizes of boxes during operation.

An example goods to person workstation may be used to retrieve goods from a warehouse or storage area and move them into separate containers or totes to be transported (e.g., to a customer). During operation, the upper level conveyor may provide upper level containers to a given upper level container bay to allow the operator to remove one or more objects in the upper level container and place said objects into one or more lower level containers. The GTP workstation is configured to indicate to the operator which objects are to be retrieved and into which lower level container to place said objects. Upon retrieval and proper placement, the given upper level containers and lower level containers are removed via the respective upper level conveyor and lower level conveyor.

Example goods to person workstations can utilize conveyor assemblies defining a conveyor path along which one or more objects disposed on a conveyor surface can be transported to a select position defined within the GTP workstation. Conveyor assembles and/or GTP workstations can include various tote stops configured to rise to a raised position in order to physically obstruct the conveyor path and effectively stop the progress of the objects travelling along the conveyor path. Various tote stops may utilize pneumatic actuators and/or other motor-driven linear actuation mechanisms to control the position of the tote stop between nominal and raised configurations. Such tote stops can require large amounts of electronic wiring, dynamic operating mechanisms, and/or other bulky components used to control the vertical movements of the tote stop during operation thereof, which can lead to such tote stops having a bulky design with a large footprint and/or an unnecessarily large height that can impede on the amount of clearance present between an upper conveyor and a lower conveyor positioned there below.

The present invention includes a tote stop assembly comprising a cam assembly defined by a motor-driven roller that is selectively operated to rotate a cam element such that a tote stop component with a cam follower engaged with the cam element is moved throughout a vertical range of motion between a lowered position and a raised position. By utilizing a cam element secured to a motor-driven roller to drive the change in vertical position of a tote stop component (e.g., between a lowered position and a raised position) during operation of the tote stop assembly), the present invention enables a tote stop assembly configured to be selectively operable to selectively obstruct and/or facilitate product flow along a conveyor path, while enabling a more mechanically robust dynamic motion and minimizing the footprint (e.g., the vertical footprint) of the tote stop assembly such that the tote stop maintains operability while exhibiting a less spatially-intrusive design.

FIGS. 1A-1D illustrate various views of a goods to person workstation in accordance with various exemplary embodiments described herein. In various embodiments, FIG. 1 illustrates an example goods to person (GTP) workstation 10, in accordance with one or more embodiments of the present disclosure. The GTP workstation 10 may include an upper level 13a and a lower level 13b that are connected via level connector panels. In some examples, the upper level 13a is configured to receive one or more containers or totes having one or more items. These objects may take the form of one or more products, goods, stock keeping units, and/or the like. The lower level may facilitate one or more containers, such as shipping boxes. In this way, said shipping boxes may be configured to receive the one or more items and, in an instance in which the shipment is complete, be sent away via one or more conveyors to be shipped to a customer. The various operations of the GTP workstation may be carried out via a processing circuitry. The GTP workstation 10 may include one or more controller configured to facilitate execution of one or more of the operations discussed herein.

The upper level 13a may include an upper level conveyor 11 and one or more upper level container bays 14a, 14b.

The upper level conveyor 11 may be attachable to or located adjacent to an infeed conveyor (e.g., the infeed conveyor may be connected to the upper level conveyor 11, such that the infeed conveyor may provide one or more upper level containers to the upper level conveyor 11, which then may deliver the given upper level container to one of the upper level container bays 14a, 14b). Such an infeed container may urge the one or more totes onto the upper level conveyor 11.

In some examples, the one or more container bays 14a, 14b are positioned on a front or user side of the device, while the upper level conveyor 11 may be located on an opposite side from the user. In this way, containers travel along upper level conveyor 11 and, in an instance which they are to be handled by the user, selectively deposited or otherwise placed in the one or more upper level container bays 14a, 14b.

In various embodiments, the upper level container may be a tote or other style container that is retrieved from within a warehouse or storage area. For example, the upper level container may take the form of totes (e.g., made out of plastic, composite, and/or the like), that includes one or more items from which the operator will distribute to one or more lower level containers. Discussed in more detail below, the lower level containers may include individual containers for shipping or the like (e.g., made out of cardboard and/or the like). In various embodiments, the upper level containers and the lower level containers may be the same type of containers (e.g., the goods to person "GTP" Workstation 10 could be used to reorganize reusable totes or transfer a box of a given objects in a corrugated cardboard box into another type of container). As such, the upper level containers and the lower level containers could each be any one of various types of containers.

The upper level 13a may have one or more upper level container bays 14a, 14b. While the examples shown in the figures include a first upper level container bay 14a and a second upper level container bay 14b, additional or fewer container bays may be provided. In various embodiments, the number of upper level container bay 14a, 14b on the GTP workstation 10 may be based on the intended number of operators on a given GTP workstation 10. For example, a GTP workstation 10 may include a first upper level container bay 14a and a second upper level container bay 14b intended to be serviced by a single operator (e.g., an operator may retrieve objects out of one of the upper level containers in one of the upper level container bay, while a new container is being retrieved for the other upper level container bay).

In various embodiments, each of the upper level container bays 14a, 14b may each have an upper level bay conveyor 17 configured to retrieve and/or otherwise urge a given upper level container into a given upper level container bay 14a, 14b. For example, each given upper level bay conveyor 17 may be connected to the upper level conveyor 11, such that an upper level container is urged into the given upper level container bay 14a, 14b. The upper level bay conveyor 17 and/or the upper level conveyor 11 may each be one or more full width belt (FWB) conveyor (e.g., a motor driven roller (MDR) may be provided under the belt to drive the FWB. Alternatively or additionally, the upper level bay conveyor 17 and/or the upper level conveyors 11 may have rollers (automated and/or non-automated rollers) and upper level container may descend into given upper level container bay 14a, 14b based, in part, by gravity. For example, each of the upper level conveyors 11 may embody a conveyor assembly defining a conveyor surface 11a along which an object may be disposed for transportation along a conveyor path to an adjacent downstream portion of the conveyor assembly and/or the GTP workstation 10.

The lower level 13b may contain one or more lower level container bays 18a-18d, which may receive a lower level container. The lower level containers may be a destination container for one or more objects retrieved by an operator out of the upper level containers. A partition may be provided between each of the lower level container bays 18a-18d.

In various embodiments, the size of each lower level container bay 18a-18d may be based on the size of the intended box to be used in the GTP workstation. For example, the width and length of the lower level container bay 18a-18d may be slightly higher than the respective width and length of lower level container intended for the given GTP Workstation. In some examples, the size of each lower level container bay 18a-18d may be adjustable in the height direction.

The lower level bay conveyors 18A-18D may include a roller conveyor (e.g., similar to portions of the lower level conveyor 16 and the upper level conveyor 11 shown). The roller conveyor may be motor driven rollers, non-motor driven rollers, or a combination of motor driven rollers and non-motor driven rollers. In various embodiments, all of the various conveyors discussed herein may be a FWB conveyor and/or a roller conveyor.

Figure 1B:
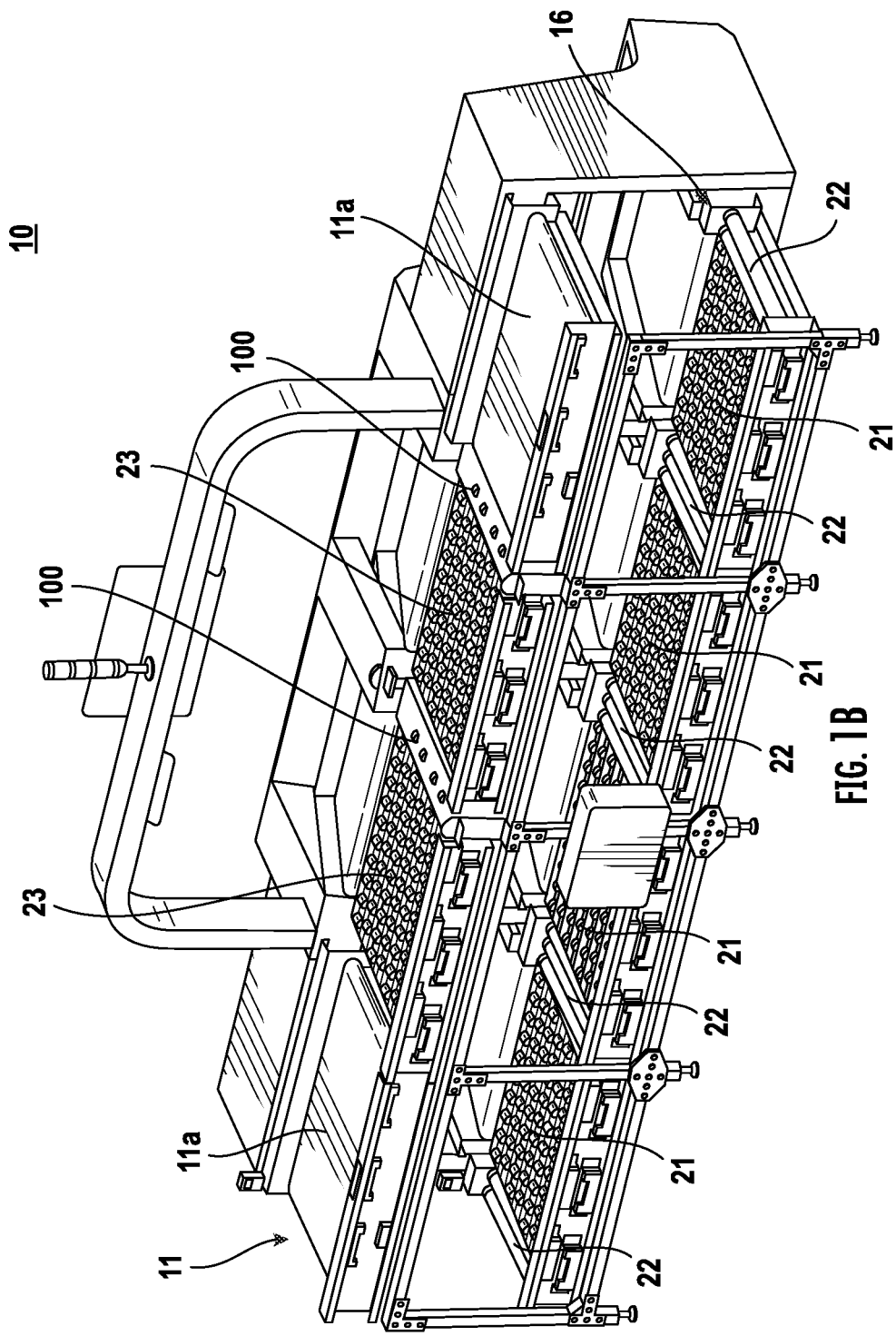

As shown in FIG. 1B, in some embodiments, the entire lower level conveyor 16 may be defined by rollers collectively defining a conveyor surface along which objects may be transported along a conveyor path. For example, the rollers 21 adjacent to the given lower container bay 18A-18D may be generally parallel to the direction of the conveyor path defined by the lower level conveyor 16. The rollers 21 may be a flat right angle transfer (FRAT). In various embodiments, additional rollers 22 may be provided adjacent to rollers 21 and are generally perpendicular to the direction of the lower level conveyor 16, such that the rollers 22 may move a container along a conveyor path defined by the lower level conveyor 16.

The upper level conveyor 11 may include one or more conveyor portions collectively defining a conveyor path along which an object may be transported on respective conveyor surfaces defined by each conveyor section. As illustrated, one or more conveyor portions of the upper level conveyor 11 (e.g., adjacent an upper level container bay) may be defined by rollers 23 adjacent the corresponding upper level container bay 14a, 14b. The rollers 23 being generally parallel to the direction of the upper level conveyor 11. The rollers 23 may be a flat right-angle transfer (FRAT). In various embodiments, the conveyor portions defined along the upper level conveyor 13a may include one or more of a roller conveyor (e.g., similar to portions of the lower level conveyor 16 and the upper level conveyor 13a shown), motor driven rollers, non-motor driven rollers, a FWB conveyor and a roller conveyor, and/or the like, or any operable combination thereof.

Figure 1C:
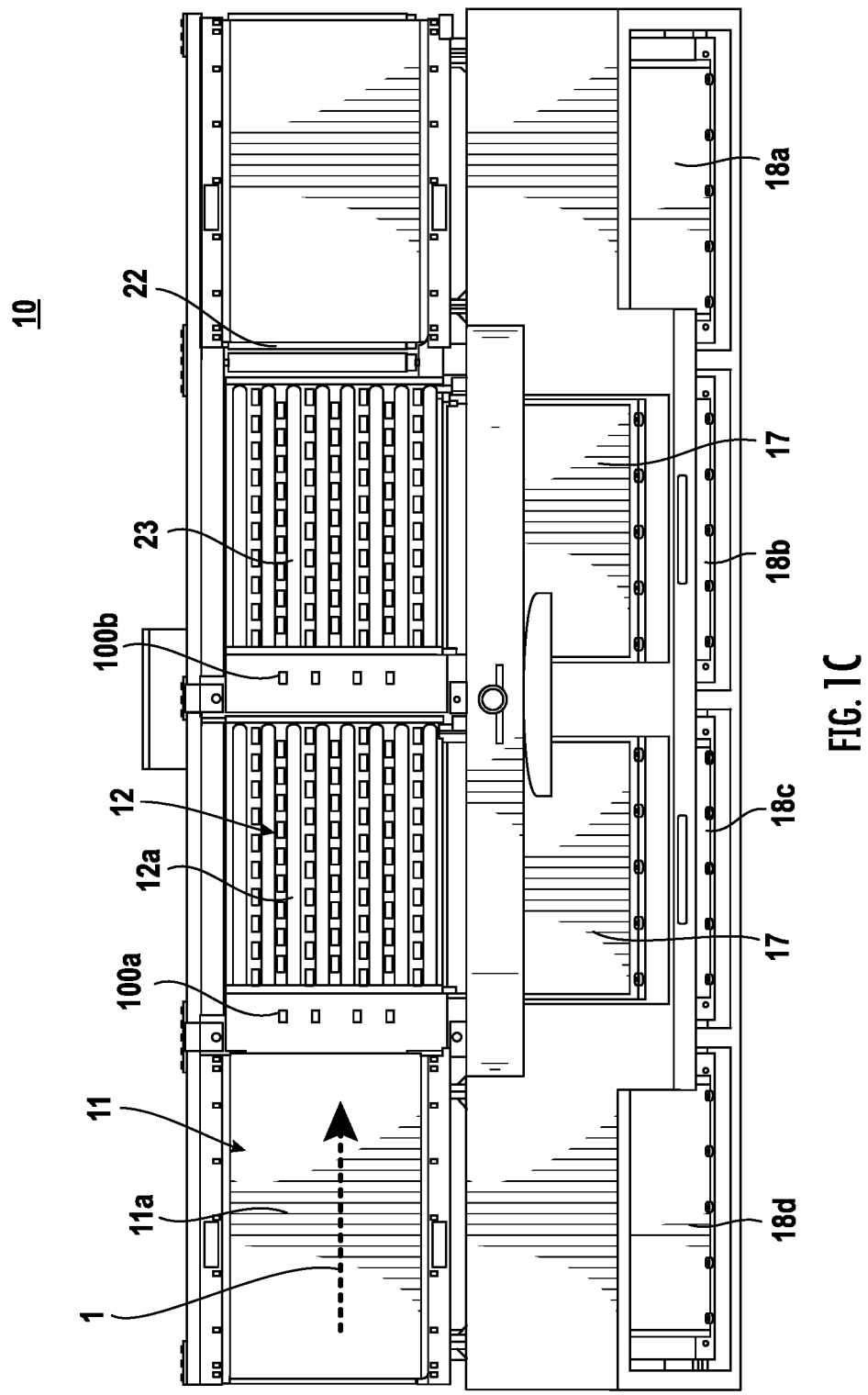

As illustrated in FIG. 1C, the upper level conveyor 13a of an exemplary workplace 10 may embody a conveyor assembly defined by plurality of adjacent conveyor portions configured to define a plurality of conveyor paths defined in respective directions along respective conveyor surfaces. For example, the upper level conveyor 13a may define a conveyor path 1 along a plurality of adjacent conveyor portions, including a first conveyor portion 11 defining a first conveyor surface 11a and a second conveyor portion defining a second conveyor surface 12a.

As illustrated, in various embodiments, a conveyor assembly defined by the GTP workspace 10 may include one or more exemplary tote stop assembly 100 provided in between adjacent conveyor portions and positioned in at least substantially perpendicular arrangement relative to the direction of conveyor path 1 defined by the upper level conveyor 13a. In various embodiments, a tote stop assembly 100 may be configured to selectively raise up to an actuated configuration wherein at least a portion of the tote stop assembly 100 defines a raised position above the conveyor surface(s) one or more of the conveyor portions adjacent thereto to obstruct the movement of an object moving along the conveyor path 1 (e.g., such that the object can be selectively redirected into an upper level container bay 14a, 14b). For example, a given tote stop assembly 100 may rise from a nominal configuration (e.g., at a lowered position in an at least substantially coplanar arrangement with the upstream conveyor surface adjacent thereto) to an actuated configuration defined by a raised vertical position above the conveyor surface 11a of the upstream adjacent conveyor section 11 to stop the object in an upstream position relative to the tote assembly 100 such that the object remains engaged with the conveyor surface 11a of the upstream adjacent conveyor section 11. In various embodiments, an exemplary tote stop assembly 100 may be selectively retracted (e.g., lowered) from an actuated configuration to nominal configuration defined by an arrangement of the tote stop assembly 100 in substantially the same plane as the one or more adjacent conveyor surfaces 11a, 12a in order to allow one or more additional objects to be moved along the conveyor path 1.

Figure 2:
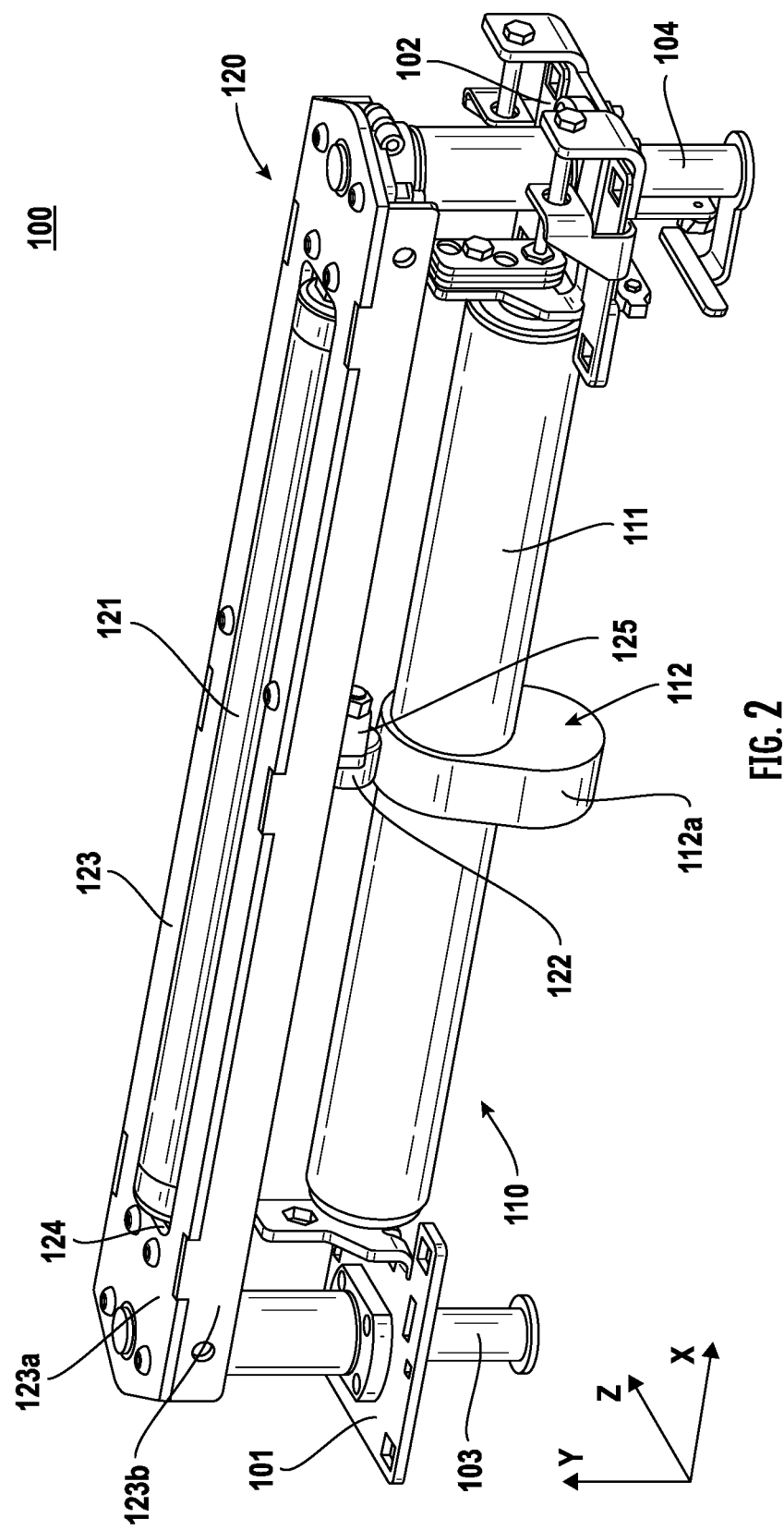
FIG. 2 illustrates a perspective view of an exemplary tote stop assembly in accordance with various exemplary embodiments described herein.

FIG. 2 illustrates a perspective view of an exemplary tote stop assembly in accordance with various embodiments described herein. In particular, FIG. 2 illustrates an exemplary tote stop assembly 100 configurable between a nominal configuration and an actuated configuration to selectively obstruct the movement of one or more objects along a conveyor path based at least in part on the operation of a motor driven roller. As illustrated, an exemplary tote stop assembly 100 may comprise one or more mounting elements, a cam assembly 110 including a drive roller 111 and a cam element 112, and a dynamic tote stop component 120 including a conveyor roller 121, a cam follower 122, and a tote stop housing 123. As described herein, the tote stop component 120 may be configured for movement in a vertical direction between a between a lowered position and a raised position based at least in part on the angular position of the cam element 112 affecting the vertical position (e.g., driving a vertical movement) of the cam follower 122 engaged therewith. For example, the selective arrangement of the tote stop assembly 100 between the nominal configuration and the actuated configuration may be defined at least in part by the movement of the tote stop component 120 between the lowered position and the raised position, respectively.

In various embodiments, the tote stop assembly 100 may comprise one or more mounting elements, such as, for example, a first mounting bracket 101 and a second mounting bracket 102, configured to be fixedly secured to a portion of a conveyor frame so as to define the position of the tote stop assembly 100 relative to a conveyor surface defined by the conveyor assembly. In various embodiments, the one or more mounting elements may include a first mounting bracket 101 configured to be secured to a first lateral conveyor frame portion of a conveyor frame (e.g., a sidewall of the conveyor frame provided along a first lateral side of the conveyor assembly) and a second mounting bracket 102 a second lateral conveyor frame portion of the conveyor frame (e.g., an opposite sidewall of the conveyor frame provided along an second lateral side of the conveyor assembly opposite the first lateral side). In such an exemplary configuration, the first and second mounting brackets 101, 102 may be fixedly secured to opposing lateral frame elements defined by the conveyor assembly such that a width defined between corresponding lateral ends of the tote stop assembly 100 spans at least a portion of a conveyor width defined by the conveyor surface in a direction at least substantially perpendicular to the conveyance direction defined by the conveyor assembly (e.g., along a conveyor path).

In various embodiments, the first and second mounting brackets 101, 102 of an exemplary tote stop assembly 100 may each be configured to receive a respective guide rod (e.g., one of the first and second guide rods 103, 104) so as to at least partially secure each of the guide rods in one or more directions relative to the respective mounting bracket 101, 102. For example, in various embodiments, the first and second guide rods 103, 104 may be slidably engaged to the first and second mounting brackets, respectively, such that each guide rod defines a respective vertical range of motion through which the guide rod 103, 104 is moveable relative to the corresponding mounting bracket 101, 102 in one or more vertical directions. Accordingly, the slidable engagement of the first and second guide rods 103, 104 with the first and second mounting brackets 101, 102 may function to at least partially secure the tote stop component 120 relative to the first and second mounting brackets 101, 102.

In various embodiments, the tote stop assembly 100 may comprise a cam assembly 110 operable to control the configuration of the tote stop assembly 100 between a nominal configuration and an actuated configuration. The cam assembly 110 may be configured to utilize a cam element 112 engaged with at least a portion of the tote stop component 120 (e.g., a cam follower 122) to facilitate the bi-directional vertical translation of the tote stop component 120 between a lowered position and a raised position. As illustrated, the cam assembly 110 of an exemplary tote stop assembly 100 may comprise an independently controllable drive roller 111 embodying a motor-driven roller (MDR). For example, the drive roller 111 may be selectively operated to cause motor-driven rotation of the drive roller 111 about a central axis thereof. As illustrated, the drive roller 111 may be rotatably mounted between the first and second mounting brackets 101, 102 of the tote stop assembly 100. For example, the first and second lateral ends of the drive roller 111 may be secured to the first mounting bracket 101 and the second mounting bracket 102, respectively, to secure (e.g., fully constrain) the linear position of the drive roller 111 relative to the first and second mounting brackets 101, 102 while enabling the drive roller to rotate about a central axis thereof. In such an exemplary configuration, the axis of rotation defined by the central axis of the drive roller 111 is oriented in the lateral direction (e.g., in the x-direction as defined in the orientation illustrated in the exemplary embodiment shown in FIG. 2).

In various embodiments, the cam assembly 110 of the exemplary tote stop assembly 100 may further comprise a cam element 112 that is fixedly secured to an outer surface of the drive roller 111. The cam assembly 110 may be configured to rotate the cam element 112 through a rotational range of motion defined about the central axis of the drive roller 111 by selectively operating the drive roller 111. For example, the cam element 112 may be secured to the drive roller 111 such that the operation of the drive roller 111 in a first rotational direction about the central axis thereof causes a corresponding (e.g., simultaneous) rotation of the cam element 112 in the first rotational direction. In various embodiments, the cam element 112 may comprise an inner aperture provided through a central portion of the cam element 112 at which the cam element 112 is configured to receive the drive roller 111, and a peripheral engagement surface 112a that defines the peripheral profile of the cam element 112. For example, the cam element 112 may be configured such that peripheral engagement surface 112a maintains a substantially continuous physical engagement with the tote stop component 120 (e.g., a cam follower 122) throughout the entire range of rotational motion defined by the cam element 112 (e.g., about the central axis of the drive roller 111).

As described in greater detail herein, an exemplary cam element 112 may be configured such that a radial distance between the central axis of the drive roller 111 (e.g., a rotational axis of the cam element) and the peripheral engagement surface 112a of the cam element 112 may vary at various angular locations about the periphery of the cam element 112. In such an exemplary configuration, the peripheral profile of the cam element 112 being defined by a variable radius dimension (e.g., between the central axis of the drive roller 111 and the peripheral engagement surface 112a) may cause a vertical separation distance defined between a cam follower 122 in contact with the cam element 112 (e.g., at the peripheral engagement surface 112a) and the central axis of the drive roller 111, as measured in the vertical direction (e.g., in the y-direction as defined in the exemplary orientation of FIG. 2), to change as the cam element 112 is rotated with the drive roller 111 through a rotational range of motion. For example, the exemplary tote stop assembly 100 may be configured such that the vertical separation distance between the central axis of the drive roller 111 and the cam follower 122 varying based on the angular position of the cam element 112 may correspond to one or more vertical movements of the tote stop component 120, such as, for example, between a raised position and a lowered position.

In various embodiments, the tote stop assembly 100 may further comprise a tote stop component 120 comprising a conveyor roller 121, a cam follower 122, and a tote stop housing 123. As illustrated, the tote stop housing 123 may be defined at least in part by an upper housing plate 123a defining a top portion of the tote stop housing 123 configured for arrangement within an at least substantially horizontal plane (e.g., in the x-z plane as defined by the exemplary orientation of the embodiment illustrated in FIG. 2) when the tote stop assembly 100 is installed relative to a conveyor assembly (e.g., along a conveyor path thereof). In various embodiments, the upper housing plate 123a may embody a material plate defining a top surface configured to face in an at least substantially upward vertical direction (e.g., in the positive y-direction, as illustrated in FIG. 2) and opposing lateral ends between which a housing width of the tote stop housing 123 may be defined in a lateral direction (e.g., in the x-direction, as defined by the exemplary orientation of the embodiment illustrated in FIG. 2). In various embodiments, the tote stop housing 123 may be fixedly secured to both a first guide rod 103 and a second guide rod 104 of the tote stop assembly 100 based on the respective top ends of the guide rods 103, 104 being fixedly connected to one of the opposing lateral ends of the upper housing plate 123a.

As described herein, the upper housing plate 123a may define an at least substantially rigid material component having a roller mount slot 124 defined therethrough. As illustrated, the roller mount slot 124 may embody an opening provided through the thickness of the upper housing plate 123a within which a conveyor roller 121 of the tote stop component 120 may be mounted relative to the tote stop housing 123. In various embodiments, the roller mount slot 124 may be defined by a slot width that extends along at least a portion of the width of the upper housing plate 123a. The tote stop component 120 may include a conveyor roller 121 rotatably mounted to the upper housing plate 123a of the tote stop housing 123 at each of the opposing lateral ends of the roller mount slot 124. For example, each lateral end of the conveyor roller 121 may be attached to a respective lateral end of the roller mount slot 124 of the tote stop housing 123 (e.g., the upper housing plate 123a) such that the linear position of the conveyor roller 121 is secured (e.g., fully constrain) relative to the tote stop housing 123 and the conveyor roller 121 is rotatable about a central axis thereof.

In various embodiments, as illustrated, the diameter of the conveyor roller 121 may be at least substantially greater than the thickness of the upper housing plate 123a to which the conveyor roller 121 is mounted such that at least a portion of the conveyor roller 121 is disposed above a top surface of the upper housing plate 123a. For example, at least a portion of the conveyor roller 121 (e.g., an upper roller portion) may protrude through the top surface of the upper housing plate 123a such that when the tote stop assembly 100 is arranged in nominal configuration defined by the tote stop component 120 being in a lowered position wherein the upper housing plate 113a defines an at least substantially coplanar arrangement with a conveyor surface defined by a conveyor portion directly upstream from the tote stop assembly 100 (e.g., as defined along the conveyor path), the portion of the conveyor roller 121 disposed above the tote stop housing 123 may be engaged by an object traveling along the conveyor path as it passes overtop the tote stop assembly 100. The rotatable configuration of the conveyor roller 121 may facilitate the movement of the object along the conveyor path by at least substantially minimizing the frictional forces acting on the object from the conveyor surface (e.g., the upper roller portion of the conveyor roller 121 at least partially supporting the weight of the object) as it travels through the portion of the conveyor path defined by the tote stop assembly 100. As a non-limiting example, the conveyor roller 121 may embody an idler roller, such as, for example, a free-rotating roller, that rotates in a rotational direction corresponding to the movement of an object traveling along the conveyor path based at least in part on a linear force imparted on the conveyor roller 121 while the object 100 moving along the conveyor path is engaged with the upper roller portion of the conveyor roller 121.

Further, in various embodiments, the tote stop housing 123 may further include a lower housing plate 123b that extends from the upper housing plate 123a in a downward direction (e.g., in the negative y-direction as defined in the exemplary orientation illustrated in FIG. 2) such that at least a portion of the lower housing plate 123b is positioned beneath the upper housing plate 123a. For example, as illustrated, the lower housing plate 123b may define an at least partially vertical configuration such that at least on surface of the lower housing plate 123b is arranged within an at least substantially vertical plane (e.g., in the x-y plane as defined by the exemplary orientation of the embodiment illustrated in FIG. 2). In various embodiments, the lower housing plate 123b may embody a material plate defining at least one outer surface configured to face in a direction towards an upstream conveyor portion of the conveyor assembly (e.g., in the negative z-direction, as illustrated in FIG. 2). For example, when the tote stop assembly 100 is installed within a conveyor assembly along a conveyor path, the tote stop component 120 may be selectively arranged in a raised position that is defined by the upper housing plate 123a being disposed above the adjacent conveyor surface defined by the conveyor portion directly upstream from the tote stop assembly 100 (e.g., as defined along the conveyor path) such that at least a portion of the lower housing plate 123b is arranged within the conveyor path. In such an exemplary configuration wherein the tote stop component 120 is provided in the raised position (e.g., wherein the tote stop assembly 100 is configured in an actuated configuration), the lower housing plate 123b of the tote stop housing 123 may function as a physical barrier positioned along a conveyor path that obstructs the product flow along the conveyor path by forcing an object traveling along the conveyor path to physically engage the lower housing plate 123b (e.g., an outer surface thereof), so as to prevent further movement of the object beyond the tote stop assembly 100.

In various embodiments, the tote stop housing 123 of an exemplary tote stop assembly 100 may define any configuration, shape, cross-sectional profile, and/or the like that enables the tote stop component 120 to function as a physical barrier that obstructs the product flow along a conveyor path in the raised position and retract out of the conveyor path upon being rearranged to a lowered position. As illustrated, the tote stop housing 123 of the exemplary tote stop assembly 100 may define a "U-shaped" design wherein the tote stop housing 123 includes a pair of lower housing plates 123b that are provided along respective longitudinal sides of the upper housing plate 123a and each extend in an at least substantially perpendicular direction (e.g., in a downward direction at least substantially perpendicular to the horizontal plane defined by the upper housing plate 123a). For example, the tote stop housing 123 may be configured in either a downward-facing or upward-facing U-shaped orientation such that at least a portion of the lower housing plate 123b is positioned beneath the upper housing plate 123a or above the upper housing plate 123a, respectively. Alternatively, and/or additionally, the tote stop housing 123 of the exemplary tote stop assembly 100 may define an "L-shaped" design wherein the tote stop housing 123 includes a single lower housing plate 123b provided along one longitudinal side (e.g., either a downstream or an upstream longitudinal side) of the upper housing plate 123a. Further, in various embodiments, the upper housing plate 123a of an exemplary tote stop housing 123 may have a solid configuration that does not include a roller mount slot or a conveyor roller provided therealong.

In various embodiments, the tote stop component 120 if an exemplary tote stop assembly 100 may comprise a cam follower 122 that is fixedly secured relative to at least a portion of the tote stop housing 123 via a cam follower frame element 125. For example, the cam follower 122 may be secured relative to one or more surfaces of the tote stop housing 123 (e.g., to the upper housing plate 123a and/or the lower housing plate 123b) such that the cam follower 122 is disposed at least partially beneath the tote stop housing 123. The cam follower 122 is positioned relative to the cam assembly 110 such that at least a portion of the cam follower 122 physically engages the cam element 112 at a peripheral engagement surface 112a defined by the cam element 112. In various embodiments, the cam follower 122 may be secured relative to the tote stop housing 123 via a cam follower frame element 125 that is rigidly secured to the tote stop housing 123 such that the linear position of the cam element 122 is at least substantially fixed (e.g., fully constrained) relative to the tote stop housing 123.

In various embodiments, the cam follower 122 is configured to remain in contact with the cam element 112 be configured to remain engaged with the cam element 112 as the cam element 112 is rotated about the central axis of the drive roller 111. For example, the cam follower 122 may be configured to maintain an at least substantially continuous physical contact with the peripheral engagement surface 112a of the cam element 112 throughout the entirety of the rotational range of motion define by the cam element 112. As described herein, the tote stop component 120 may be configured such that as the drive roller 111 is rotated to change the angular position of the cam element 112, the cam follower 122 may exhibit a resultant vertical movement relative to the central axis defined by the drive roller 111. As illustrated, in various embodiments, the cam follower 122 may be arranged above the cam element 112 in vertical alignment with the central axis defined by the drive roller 111. For example, the cam follower 122 may define a central portion, a central axis, a center of gravity, and/or the like that is defined at a position within substantially the same vertical plane as the central axis of the drive roller 111. As an illustrative example, in various embodiments an exemplary cam follower 122 may be configured to rotate about a central axis thereof that defines a coplanar arrangement relative to the central axis of the drive roller 111, wherein both axes of rotation are oriented within at least substantially the same vertical plane defined along a lateral width of the assembly 100 and facing in a longitudinal direction perpendicular thereto (e.g., in the x-z plane as defined in the exemplary orientation illustrated in FIGS. 4A and 4B). The cam follower 122 within at least s. For example, the cam element 112 may be rotated from a first angular position in which the cam follower 122 engaged therewith is disposed at a first height position (e.g., defined relative to the central axis of the drive roller 111) to a second angular position such that the cam follower 122 is translated in an upward vertical direction to a second height position.

In various embodiments, the cam follower 122 may be secured relative to the tote stop housing 123 such that the vertical movement of the cam follower 122 in either an upward vertical direction (e.g., in the positive y-direction as defined in the exemplary orientation illustrated in FIG. 2) or a downward vertical direction (e.g., in the negative y-direction as defined in the exemplary orientation illustrated in FIG. 2) causes the tote stop housing 123 to exhibit an at least substantially similar vertical movement in either the upward or downward vertical direction. For example, in an exemplary circumstance wherein the drive roller 111 being rotated to reconfigure the cam element 112 from a first angular position to a second angular position causes the cam follower 122 engaged with the cam element 112 (e.g., with the peripheral engagement surface 112a) to move from a first height position to a second height position, the tote stop component 120 may be configured such that the tote stop housing 123 exhibits a vertical movement that is at least substantially similar to (e.g., equal to) the movement of the cam follower 122 from the first height position to the second height position. In various embodiments, the tote stop assembly 100 may be configured such that the arrangement of the tote stop component 120 between the raised position and the lowered position may correspond to the position of the cam follower 122 (e.g., the height position defined relative to the central axis of the drive roller 111) such that the tote stop component 120 may be selectively moved between the raised position and the lowered position by selectively operating the drive roller 111 to rotate the cam element 112 through at least a portion of the rotational range of motion.

As described herein, the tote stop component 120 may define a dynamic configuration relative to the first and second mounting brackets 101, 102 in which the tote stop component 120 is configured for movement in one or more vertical directions through a range of motion extending between a raised position and a lowered position. In various embodiments, the vertical movement of the tote stop component 120 between the raised and lowered positions, as described herein, may be defined at least in part by a first guide rod 103 and a second guide rod 104 that are fixedly attached to the tote stop housing 123 being slidably engaged with a first mounting bracket 101 and a second mounting bracket 102, respectively. In various embodiments, the first and second guide rods 103, 104 may each be engaged by a respective mounting bracket (e.g., within a vertical sleeve feature of each mounting bracket) so as to be fixed in one or more lateral and/or longitudinal directions and moveable relative to the respective mounting bracket in one or more vertical directions defined along a respective vertical axis (e.g., defined in a y-direction as defined in the exemplary orientation illustrated in FIG. 2). The slidable engagement of the guide rails 103, 104 with the mounting brackets 101, 102 may enable the tote stop housing 123 to move relative to the mounting brackets 101, 102 in one or more vertical directions. As illustrated, the tote stop housing 123 of an exemplary tote stop component 120 may be fixedly secured to the upper end of each guide rod 103, 104. In various embodiments, each guide rail 103, 104 may comprise a lower stop feature defined at a respective bottom end thereof that is configured to engage the corresponding mounting bracket 101, 102 to prevent further movement of the guide rail 103, 104 in an upward vertical direction (e.g., in the positive y-direction as defined in the exemplary orientation illustrated in FIG. 2) upon the respective bottom end of the guide rail 103, 104 reaching the mounting bracket 101, 102.

Figure 3A:
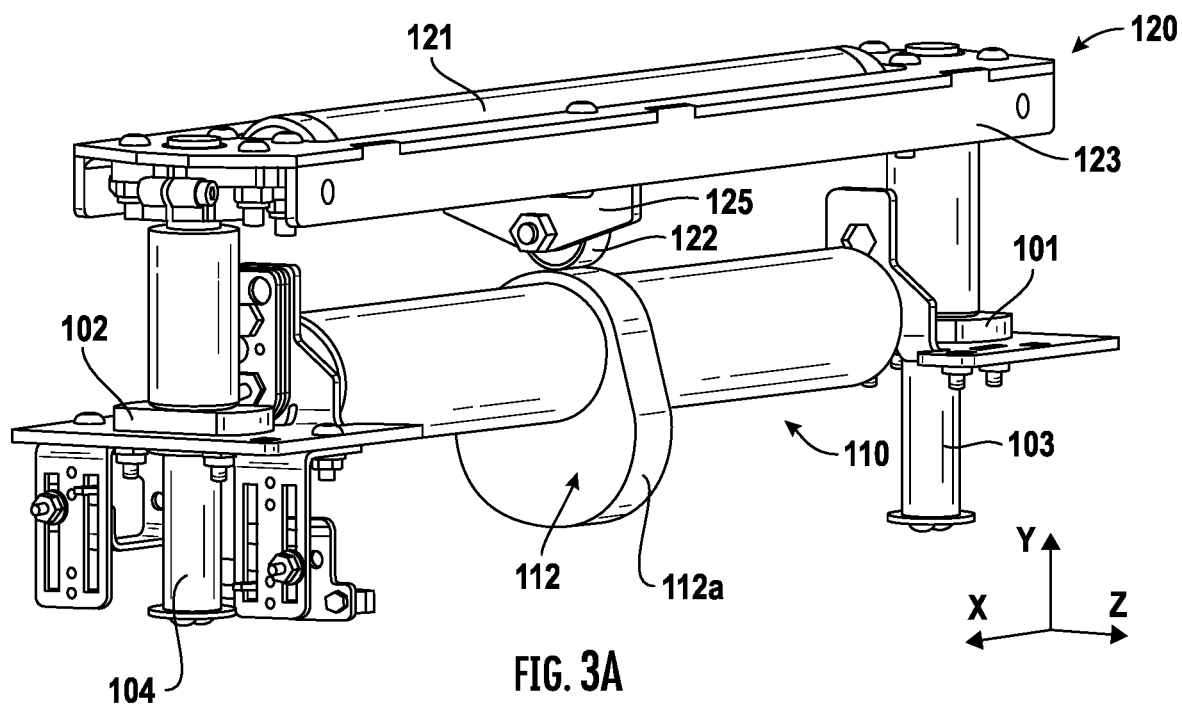
FIGS. 3A-3B illustrate various perspective views of an exemplary tote stop assembly in accordance with various exemplary embodiments described herein.
Figure 3B:
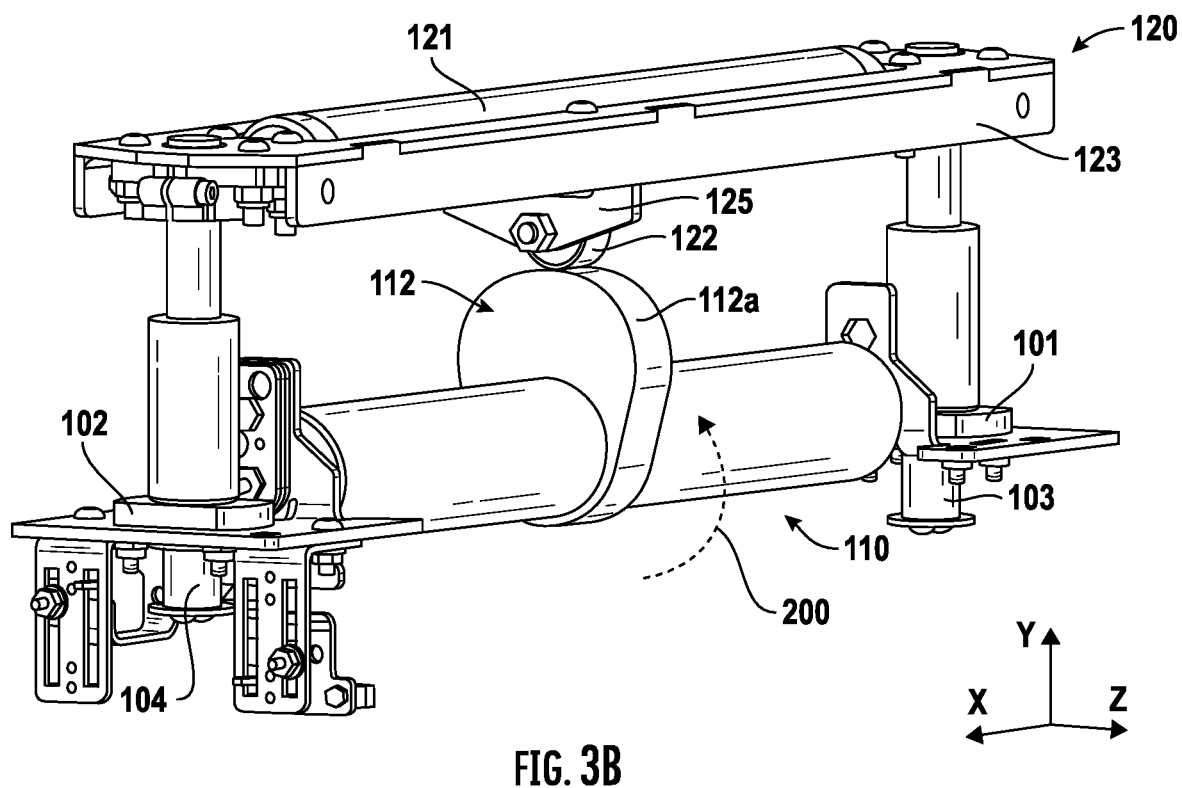

FIGS. 3A-3B illustrate various perspective views of an exemplary tote stop assembly in accordance with various embodiments described herein. In particular, FIGS. 3A and 3B illustrate an exemplary tote stop assembly 100 comprising a motor-driven cam assembly 110 configured to operate a drive roller 111 to drive a bi-directional vertical movement of a tote stop component 120 to selectively configure the tote assembly 100 between a nominal configuration and an actuated configuration, illustrated in FIGS. 3A and 3B, respectively. In various embodiments, the exemplary tote stop assembly 100 may be configured to selectively operate the drive roller 111 (e.g., an MDR) to rotate the drive roller 111 about a central axis thereof in a first rotational direction through an angle of rotation in order to cause a cam element 112 secured to the drive roller 111 to be repositioned from a first angular position to a second angular position. For example, the cam assembly 110 of the tote stop assembly 100 may be configured such that as the drive roller 111 is rotated in the first rotational direction through the angle of rotation, the cam element 112 exhibits an at least substantially similar (e.g., identical) rotation about the drive roller 111 central axis in the first rotational direction through at least substantially the same angle of rotation such that the position of the cam element 112, as defined relative to the central axis, is driven from the first angular position to a second angular position.

As illustrated in FIG. 3A, the cam element 112 may be arranged in a first angular position (e.g., relative to the central axis of a drive roller 111) defined by an arrangement of the cam element 112 in which the cam follower 122 disposed above the cam element 112 is in physical contact with the cam element 112 at a portion of the peripheral engagement surface 112a that is closest to the central axis of the drive roller 111. As a non-limiting example provided for illustrative purposes, a cam element 112 in the first angular position, as illustrated in FIG. 3A, may be disposed in a downward-facing position wherein the cam element 112 is oriented in a downward vertical direction (e.g., in the negative y-direction as defined by the exemplary orientation illustrated in FIG. 3A). For example, the first angular position of the cam element 112 may be defined by the cam element 112 being oriented about the drive roller 111 central axis such that the cam element 112 is engaged with the cam follower 122 at a first portion of the peripheral engagement surface 112a defining the smallest separation distance (e.g., radius) relative to the central axis of the drive roller 111. As described herein, the arrangement of the cam element 112 in such an exemplary angular position may correspond to the cam follower 122 engaged therewith being at a vertical position that is as close to the drive roller 111 central axis as the cam follower 122 will be during operation of the tote stop assembly 100 (e.g., throughout the rotational range of motion of the cam element 112). The cam follower 122 of the tote stop component 120 being provided in such a vertical position (e.g., based on the arrangement of the cam element 112 in the first angular configuration) may correspond to the tote stop component 120 being positioned in the lowered position. In various embodiments, a nominal configuration of an exemplary tote stop assembly 100, as illustrated in FIG. 3A, may be defined, at least in part, by the tote stop component 120 being provided in the lowered position.

As illustrated in FIG. 3B, the cam element 112 may be rotated with the drive roller 111 in a first rotational direction 200 (e.g., in a counter clockwise rotational direction as defined by the exemplary orientation illustrated in FIG. 3B) to a second angular position defined by an arrangement of the cam element 112 in which the cam follower 122 is in physical contact with the portion of the peripheral engagement surface 112a that is furthest away from the central axis of the drive roller 111. As described herein, where the cam follower 122 is configured to remain in contact with the peripheral engagement surface 112a throughout the rotational range of motion of the cam element 112, the non-uniform radius defined by the cam element 112 may cause the upward vertical pushing force applied to the cam follower 122 from the cam element 112 to vary as the cam element 112 rotates from the first angular position (e.g., as described in reference to FIG. 3A) to the second angular position illustrated in FIG. 3B. As the cam element 112 rotates about the central axis of the drive roller 111 to the second angular position, the cam follower 122 may transition from contacting the first portion of the peripheral engagement surface 112a (e.g., defining the smallest separation distance relative to the central axis of the drive roller 111) to contacting the second portion of the peripheral engagement surface 112a defining the largest separation distance relative to the central axis of the drive roller 111.

As a non-limiting example provided for illustrative purposes, a cam element 112 in the second angular position, as illustrated in FIG. 3B, may be disposed in an upward-facing position wherein the cam element 112 is oriented in an upward vertical direction (e.g., in the positive y-direction as defined by the exemplary orientation illustrated in FIG. 3B). For example, the second angular position of the cam element 112 may be defined by the cam element 112 being oriented about the drive roller 111 central axis such that the cam element 112 is engaged with the cam follower 122 at a second portion of the peripheral engagement surface 112a defining the largest separation distance (e.g., radius) relative to the central axis of the drive roller 111. As described herein, the arrangement of the cam element 112 in such an exemplary angular position may correspond to the cam follower 122 being at a vertical position that is as far away from the drive roller 111 central axis as the cam follower 122 will be during operation of the tote stop assembly 100 (e.g., throughout the rotational range of motion of the cam element 112). The cam follower 121 of the tote stop component 120 being provided in such a vertical position (e.g., based on the arrangement of the cam element 112 in the second angular configuration) may correspond to the tote stop component 120 being positioned in the raised position. In various embodiments, an actuated configuration of an exemplary tote stop assembly 100, as illustrated in FIG. 3B, may be defined, at least in part, by the tote stop component 120 being provided in the raised position.

As a non-limiting example, in various embodiments, the cam element 112 may be configured such that the first portion and the second portion of the peripheral engagement surface 112a defining the smallest and largest separation distances relative to the central axis of the drive roller 111, respectively, may embody opposing ends of the cam element 112. In such an exemplary configuration, based at least in part on the configuration of the cam element 112 (e.g., the radius dimension defined between the central axis and the peripheral engagement surface 112a), a rotation of the cam element 112 from the first angular position to the second angular position may be defined by an angle of rotation of at least substantially 180 degrees about the central axis of the drive roller 111.

Figure 4A:
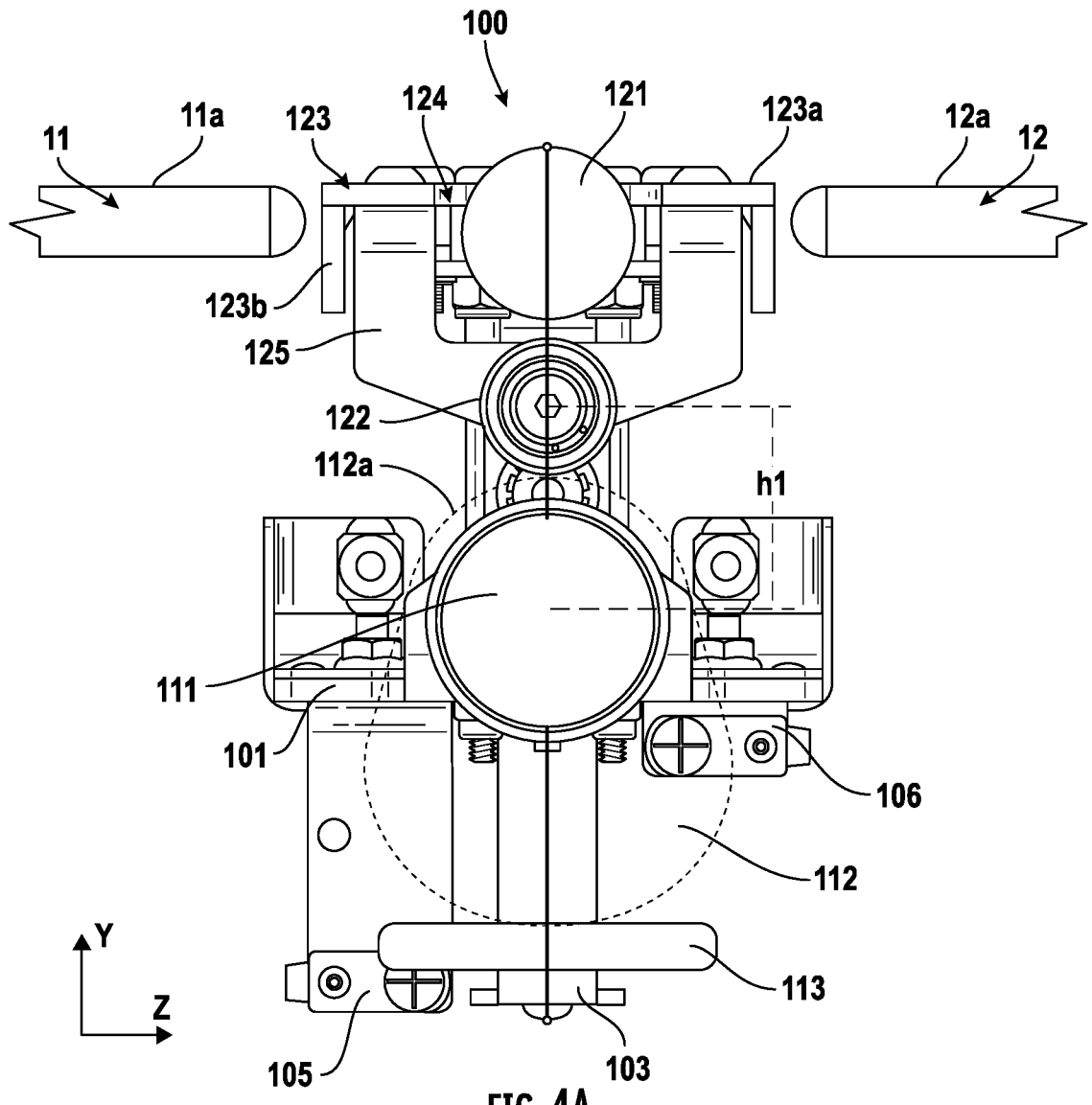
FIGS. 4A-4B illustrate various cross-sectional side views of an exemplary tote stop assembly positioned relative to a conveyor surface of a conveyor apparatus in accordance with various exemplary embodiments described herein.
Figure 4B:
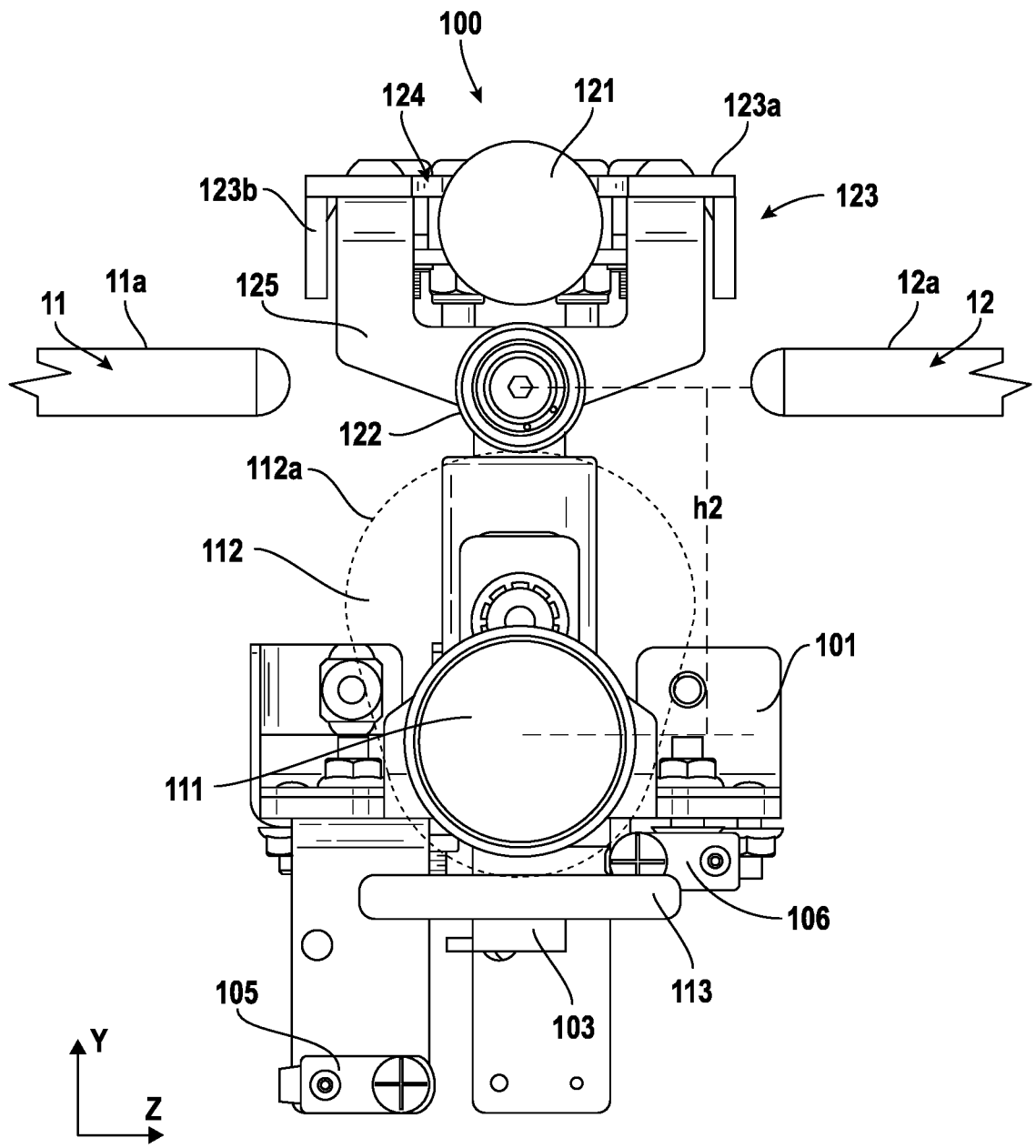

With further reference to FIGS. 4A-4B, in various embodiments, the tote stop component 120 of an exemplary tote stop assembly 100 may be configured to vertically translate in an upward vertical direction from a nominal configuration to an actuated configuration, wherein the actuated configuration is defined at least in part by a top surface of a tote stop housing 123 (e.g., the upper housing plate 123a) defined by the tote stop component 120 being disposed further away from the drive roller 111 (e.g., as defined in the vertical direction) than it was in the nominal configuration. The tote stop assembly 100 may be selectively reconfigured from a nominal configuration to an actuated configuration by operating the drive roller 111 to impart one or more forces on the tote stop component 120 via the cam element 112 being rotated with the drive roller 111 such that the tote stop component 120 is moved in one or more directions relative to a rigid mounting bracket of the tote stop assembly 100. For example, the drive roller 111 of a tote stop assembly 100 configured in a nominal configuration may be operated to rotate the cam element 112 such that the tote stop component 120 engaged therewith (e.g., at the cam follower 122) is pushed in an upward vertical direction (e.g., in the positive y-direction as defined in the exemplary orientation illustrated in FIGS. 4A and 4B) to a raised position. As described herein, the drive roller 111 may be selectively operated to reconfigure the tote stop assembly 100 in an actuated configuration, wherein at least a portion of the tote stop component 120 is positioned vertically above the adjacent conveyor surface such that the tote stop assembly 100 is configured to physically engage an object being transported along the conveyor surface to stop the object at the tote stop assembly 100 and prevent further movement of the object along a conveyor path.

For example, FIG. 4A illustrates an exemplary tote stop assembly 100 configured in a nominal configuration. As illustrated, the cam element 112 is arranged in a first angular position, as described herein, such that the cam follower 122 engaged with the peripheral engagement surface 112a is positioned at a first vertical position defined at least in part by a first vertical separation distance h1 between the cam follower 122 (e.g., a center point thereof) and the central axis of the drive roller 111, as measured along a vertical axis (e.g., in a y-direction, as defined in the exemplary orientation illustrated in FIG. 4A). In various embodiments, the tote stop assembly 100 may be configured such that the first vertical separation distance h1 defined by the cam follower 122 in the first vertical position may correspond to the tote stop component 120 being arranged in a lowered position. In various embodiments, as illustrated, the lowered position of the tote stop component 120 defined in part by the first vertical separation distance h1 may be correspond to the tote stop housing 123 being in an at least substantially in-line arrangement with a conveyor surface defined by an adjacent conveyor portion (e.g., a conveyor surface 11a of an adjacent upstream conveyor portion 11, a conveyor surface 12a of an adjacent downstream conveyor portion 12). In such an exemplary configuration, for example, the tote stop assembly 100 being configured in the nominal configuration may be defined by the tote stop housing 123 of the tote stop component 120 being disposed vertically below the adjacent conveyor surface(s) (e.g., conveyor surface 11a) such that the tote stop housing 123 does not intersect, interfere, and/or otherwise physically obstruct a conveyor path defined by the conveyor assembly. For example, as shown, the tote stop component 120 may be positioned in the lowered position such that an object traveling along the conveyor path from an upstream conveyor surface 11a may pass overtop the tote stop assembly 100 (e.g., via an engagement with the conveyor roller 121) without being stopped by the tote stop assembly 100 (e.g., without abutting against a lower housing plate 123b).

In various embodiments, the drive roller 111 of the cam assembly may be selectively operated to cause the tote stop component 100 to be reconfigured to the actuated configuration, as illustrated in FIG. 4B. As illustrated, the cam element 112 is arranged in a second angular position, as described herein, such that the cam follower 122 engaged with the peripheral engagement surface 112a is positioned at a second vertical position defined at least in part by a second vertical separation distance h2 between the cam follower 122 (e.g., a center point thereof) and the central axis of the drive roller 111. The second vertical separation distance h2 defined by the cam follower 122 illustrated in FIG. 4B may be at least substantially greater than the first vertical separation distance h1 defined by the arrangement of the cam follower 122 in the first vertical position, as illustrated in FIG. 4A. Accordingly, the cam follower 122 being positioned in the second vertical position to define the second vertical separation distance h2 may correspond to the tote stop component 120 being arranged in the raised position. In various embodiments, as illustrated, the raised position of the tote stop component 120 defined in part by the second vertical separation distance h2 may be correspond to the tote stop housing 123 being in an at least substantially elevated arrangement with respect to the conveyor surface of the adjacent conveyor portion (e.g., the upstream conveyor surface 11a of the adjacent upstream conveyor portion 11, the downstream conveyor surface 12a of the adjacent downstream conveyor portion 12). In such an exemplary configuration, the tote stop assembly 100 being configured in the actuated configuration may be defined by the tote stop housing 123 of the tote stop component 120 being disposed vertically above the adjacent conveyor surface(s) (e.g., upstream conveyor surface 11a) such that at least a portion of the tote stop housing 123 intersects, interferes, and/or otherwise physically obstructs the conveyor path defined by the conveyor assembly. The tote stop assembly 100 configured in the actuated configuration may function as a barrier that stops the movement of an object travelling along a conveyor surface by causing a physical engagement between the object and an at least substantially rigidly component of the tote stop assembly 100 that results in the object being stopped in a position at the tote stop assembly 100. For example, as illustrated, the second vertical separation distance h2 defined by the second vertical position of the cam follower 122 when the cam element 112 is in the illustrated second angular configuration may correspond to least a portion of the tote stop component 120 being raised above the conveyor surface in order to force an object travelling along the conveyor path to be physically abutted against an upstream-facing surface of the tote stop component 120 (e.g., an outer surface of the lower housing plate 123b), thereby preventing the object from moving further along the conveyor path. For example, as shown, the tote stop component 120 may be positioned in the raised position such that an object traveling along the conveyor path from the upstream conveyor surface 11a may collide with a portion of the tote stop housing 123, such as, for example, the lower housing plate 123b, configured to stop the momentum of the object prior to the object reaching the conveyor roller 121, thereby rendering the conveyor roller 121 obsolete when the tote stop assembly 100 is configured in the actuated configuration (e.g., when the tote top component 120 is position in the raised position).

In various embodiments, an exemplary tote stop assembly 100 may comprise one or more position sensors configured to capture position data associated with one or more components of a tote stop assembly 100 that corresponds at least in part to the vertical position of the tote stop component 120 in order to facilitate a data-driven determination (e.g., via a controller communicably connected with the tote stop assembly 100) that the tote stop component 120 is positioned in a lowered position, a raised position, and/or in one or more vertical positioned defined therebetween. For example, as illustrated in FIGS. 4A and 4B, the tote stop assembly 100 may comprise a plurality position sensors fixedly secured relative to a mounting bracket 101 of the tote stop assembly 100, each configured to measure and/or capture position data associated with at least one of the guide rods 103 attached to the tote stop component 120. As described herein, a first guide rod 103 may be fixedly secured relative to the tote stop component 120 such the vertical position of the tote stop component 120 relative to the mounting bracket 101 is defined at least in part by the relative position of the first guide rod 103 with respect to the mounting bracket 101 engaged therewith.

For example, as illustrated, the plurality of sensors of an exemplary tote stop assembly 100 may comprise a first position sensor 105 secured in a fixed position relative to (e.g., below) the mounting bracket 101 such that, the first position sensor 105 may detect when the first guide rod 103 is disposed in a vertical position corresponding to the tote stop component 120 engaged therewith being in a lowered position. As an illustrative example, the first position sensor 105 may embody a proximity sensor configured to detect the presence of the first guide rod 103 and/or a rod position flag 113 operatively attached thereto, within a threshold proximity distance of the first position sensor 105. In various embodiments, the first position sensor 105 may be secured relative to the mounting bracket 101 in a position in which the guide rod 103 is detectably positioned in sufficient proximity to the first position sensor 105 (e.g., in front of the sensor 105) in an instance when the tote stop component 120 is positioned in the lowered position. As such, the tote stop assembly 100 (e.g., a controller) may be configured to utilize the data captured by the first position sensor 105 to detect when the tote stop component 120 is position in the lowered position and/or determiner when the tote stop assembly 100 is configured in a nominal configuration.

In various embodiments, an exemplary tote stop assembly 100 may be configured to determine the position of the tote stop component 120, such as, for example, whether the tote stop component 120 is in the raised or lowered position, by determining the angular position of the cam element 112 about the central axis of the drive roller 111. For example, in various embodiments, as the drive roller 111 is rotated by a drive motor such that the cam element 112 is similarly rotated about the central axis of the drive roller 111, the non-uniform peripheral profile defined by the cam element 112 may cause the impedance of the drive motor to vary as the rotation of the cam element 112 applies a variable force to be imparted on the cam follower 122 contacting the peripheral engagement surface 112a. In various embodiment, the tote stop assembly 100 (e.g., a controller communicatively connected with the drive motor operating the drive roller 111) may be configured to determine the angular position of cam element 112 at a particular instance based at least in part on the impedance measured at the drive motor at that instance. Accordingly, the tote stop assembly 100 may be configured to determine the position of the tote stop component 120 based at least in part on the determined angular position of the cam element 112.

Further, in various embodiments, the cam element 112 may be configured such that the peripheral profile thereof is defined at least in part by one or more homing features designed to result in a corresponding known impedance value at the drive motor as the specific homing features is rotated through an engagement with the cam follower 122. As a non-limiting example, a cam element 112 may be defined by a ramp feature that is provided along the peripheral engagement surface 112a such that the ramp feature is configured to physically contact the cam follower 122 when the cam element 112 is rotated to and/or through a corresponding angular position. In various embodiments, such an exemplary ramp feature may be defined by a discrete and/or non-continuous curvature of the peripheral engagement surface 112a that is specifically configured to result in the drive motor of the drive roller 111 exhibiting a known impedance value as the rotation of the cam element 112 causes the ramp feature to push against the cam follower 122. In such a configuration, a cam element 112 defining such an exemplary homing feature (e.g., a ramp feature and/or any other geometric feature) may be configured to facilitate the determination of the position of the tote stop component 120 by facilitating the detection of an instance in which the cam element 112 is oriented in a known angular position corresponding to the position of the homing feature along the peripheral engagement surface 112a. The tote stop assembly 100 (e.g., the controller) may be configured to identify the angular position of the cam element 112 about the central axis of the drive roller 111 based at least in part on the detection of an impedance value at the drive motor that is known to be indicative of the homing feature engaging the cam follower 122 of the tote stop component 120.

Further, as illustrated, the plurality of sensors of an exemplary tote stop assembly 100 may comprise a second position sensor 106 secured in a fixed position relative to (e.g., below) the mounting bracket 101 such that, the second position sensor 106 may detect when the first guide rod 103 is disposed in a vertical position that corresponds to the tote stop component 120 engaged therewith being in a raised position. As an illustrative example, the second position sensor 106 may embody a proximity sensor configured to detect the presence of the first guide rod 103 and/or a rod position flag 113 operatively attached thereto, within a threshold proximity distance of the second position sensor 106. In various embodiments, the second position sensor 106 may be secured relative to the mounting bracket 101 in a second position different from the first position defined by the first position sensor 105. The second position sensor 106 may be configured in a second position wherein the guide rod 103 is detectably positioned in sufficient proximity to the second position sensor 106 (e.g., in front of the sensor 106) in an instance when the tote stop component 120 is positioned in the raised position. As such, the tote stop assembly 100 (e.g., a controller) may be configured to utilize the data captured by the second position sensor 106 to detect when the tote stop component 120 is position in the raised position and/or determine when the tote stop assembly 100 is configured in an actuated configuration.

As illustrated, the guide rod flag 113 may be fixedly secured to the guide rod 103 such that the guide rod flag 113 is moved in one or more vertical directions along with the guide rid 103. The guide rod flag 113 is configured to intersect each of a first detection field defined by a first position sensor 105 and a second detection field defined by the second position sensor 106 as the guide rod 103 is moved in one or more vertical directions corresponding to the arrangement of the tote stop component 120 between the lowered and raised positions. The guide rod flag 113 may be configured to be disposed with the first detection field defined by the first position sensor 105 when the tote stop component 120 is positioned in the lowered position and be disposed with the second detection field defined by the second position sensor 106 when the tote stop component 120 is positioned in the raised position.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tote stop assembly configured for a conveyor assembly, the tote stop assembly comprising:
    a cam assembly comprising a cam element secured relative to an outer surface of a drive roller, the drive roller being configured to cause motor-driven rotation of the cam element about a central axis of the drive roller;
    a tote stop component comprising a cam follower configured for physical engagement with the cam element such that the motor-driven rotation of the cam element causes a vertical movement of the tote stop component between a raised position and a lowered position; and one or more position sensors configured to capture position data corresponding to a vertical position of the tote stop component;

wherein the tote stop assembly is configurable in an actuated configuration to selectively obstruct one or more objects from moving along a conveyor path based on an operation of the drive roller, the actuated configuration being defined at least in part by the tote stop component being arranged in the raised position.

2. The tote stop assembly of claim 1, wherein the tote stop assembly is configurable in a nominal configuration to selectively enable the one or more objects to move over the tote stop assembly along the conveyor path based on the operation of the drive roller, the nominal configuration being defined at least in part by the tote stop component being arranged in the lowered position.

3. The tote stop assembly of claim 2, wherein the tote stop component is configured such that, in the lowered position, a top surface defined by a tote stop housing is positioned in an at least substantially coplanar arrangement within an adjacent conveyor surface.

4. The tote stop assembly of claim 1, wherein the tote stop component is configured such that, in the raised position, at least a portion of a tote stop housing is positioned vertically above an adjacent conveyor surface, so as to embody a physical obstacle positioned along the conveyor path.

5. The tote stop assembly of claim 1, wherein the drive roller of the cam assembly is configured to be selectively operated based at least in part on the position data captured by the one or more position sensors.

6. The tote stop assembly of claim 1, wherein the one or more position sensors are configured to detect when the tote stop component is positioned in one or more of the raised position and the lowered position.

7. The tote stop assembly of claim 6, wherein the one or more position sensors include a first position sensor configured to captured first position data corresponding to the tote stop component being in the raised position and a second position sensor configured to captured second position data corresponding to the tote stop component being in the lowered position.

8. The tote stop assembly of claim 1, wherein the one or more position sensors are mounted to a mounting bracket rigidly connected to a conveyor frame element of the conveyor assembly and configured to receive at least a portion of the tote stop assembly in order to secure the tote stop assembly in an installed position along the conveyor path.

9. The tote stop assembly of claim 1, wherein the tote stop assembly comprises one or more guide rod secured to the tote stop component, the one or more guide rod being positioned in an at least substantially vertical configuration and configured to at least partially define a vertical range of motion of the tote stop component relative to the cam assembly.

10. The tote stop assembly of claim 9, wherein the one or more guide rod slidably engaged to one or more mounting brackets such that each guide rod defines a respective vertical range of motion through which the one or more guide rod is moveable relative to a mounting bracket in one or more vertical directions.

11. The tote stop assembly of claim 1, wherein the drive roller is configured such that the central axis thereof is oriented an at least substantially lateral direction, the at least substantially lateral direction being at least substantially perpendicular to a conveyance direction of the conveyor path.

12. The tote stop assembly of claim 1, wherein the cam assembly is configured such that the motor-driven rotation of the cam element causes the cam element to move from a first angular position to a second angular position, wherein the first angular position corresponds to the tote stop component being positioned in the lowered position and the wherein the second angular position corresponds to the tote stop component being positioned in the raised position.

13. The tote stop assembly of claim 12, wherein the first angular position of the cam element is defined at least in part by a first radial distance between the central axis of the drive roller and a first portion of a peripheral engagement surface of the cam element engaged with the cam follower, and wherein the second angular position of the cam element is defined at least in part by a second radial distance between the central axis of the drive roller and a second portion of the peripheral engagement surface of the cam element engaged with the cam follower, the second radial distance defined by the second angular position of the cam element being at least substantially greater than the first radial distance defined by the first angular position of the cam element such that a vertical separation between the cam follower and the central axis is increased as the cam element is rotated from the first angular position to the second angular position.

14. The tote stop assembly of claim 12, wherein the motor-driven rotation of the cam element from the first angular position to the second angular position is defined by the cam element being rotated through an angle of rotation of at least approximately 180 degrees.

15. The tote stop assembly of claim 1, wherein the tote stop component comprises a tote stop housing secured relative to the cam follower such that the tote stop housing moves with the cam follower through a vertical range of motion based in part on the motor-driven rotation of the cam element engaged with the cam follower.

16. The tote stop assembly of claim 15, wherein the tote stop housing defines a roller mount slot provided along a top surface thereof, and wherein the tote stop component further comprises a conveyor roller mounted within the roller mount slot of the tote stop housing, the tote stop assembly being configured such that the tote stop component being positioned in the lowered position is defined at least in part by the conveyor roller being positioned to engage the one or more objects moving along the conveyor path to facilitate movement of the one or more objects over the tote stop assembly.

17. The tote stop assembly of claim 16, wherein the central axis of the drive roller defines a first axis of rotation and a second central axis of the conveyor roller defines a second axis of rotation, wherein the first axis of rotation and the second axis of rotation are arranged in at least substantially parallel configuration relative to one another.

18. The tote stop assembly of claim 1, wherein the tote stop component comprises a tote stop housing defined at least in part by a side engagement surface configured to embody a physical obstruction when the tote stop component is positioned in the raised position.

19. The tote stop assembly of claim 1, wherein the conveyor assembly is defined at least in part by a goods to person workstation.

* * * * *